US010443269B2

(12) United States Patent
Piirainen et al.

(10) Patent No.: US 10,443,269 B2
(45) Date of Patent: Oct. 15, 2019

(54) ELECTROMECHANICAL LOCK UTILIZING MAGNETIC FIELD FORCES

(71) Applicant: ILOQ OY, Oulu (FI)

(72) Inventors: Mika Piirainen, Oulu (FI); Mika Pukari, Oulu (FI)

(73) Assignee: ILOQ OY, Oulu (FI)

( * ) Notice: Subject to any disclaimer, the term of this patent is extended or adjusted under 35 U.S.C. 154(b) by 98 days.

(21) Appl. No.: 15/742,581

(22) PCT Filed: Jul. 11, 2016

(86) PCT No.: PCT/EP2016/066406
§ 371 (c)(1),
(2) Date: Jan. 8, 2018

(87) PCT Pub. No.: WO2017/009277
PCT Pub. Date: Jan. 19, 2017

(65) Prior Publication Data
US 2018/0202193 A1 Jul. 19, 2018

(30) Foreign Application Priority Data
Jul. 13, 2015 (EP) ...................... 15176420

(51) Int. Cl.
E05B 47/00 (2006.01)
E05B 47/06 (2006.01)
H02K 49/10 (2006.01)

(52) U.S. Cl.
CPC ...... *E05B 47/0669* (2013.01); *E05B 47/0012* (2013.01); *E05B 47/0038* (2013.01);
(Continued)

(58) Field of Classification Search
CPC ............. E05B 47/0669; E05B 47/0012; E05B 47/0038; E05B 47/0044; E05B 47/0615;
(Continued)

(56) References Cited

U.S. PATENT DOCUMENTS

| 2,436,939 | A | * | 3/1948 | Schug | .................... F04D 29/048 |
| | | | | | 125/30.01 |
| 3,376,615 | A | * | 4/1968 | Heckman | ............ E05B 47/0038 |
| | | | | | 215/354 |

(Continued)

FOREIGN PATENT DOCUMENTS

| DE | 102013104366 | * | 10/2014 | ............. E05B 47/06 |
| DE | 102014104607 | * | 9/2015 | ............. E05B 47/06 |

(Continued)

OTHER PUBLICATIONS

International Search Report of PCT/EP2016/066406, dated Sep. 28, 2016, 4 pages.

(Continued)

*Primary Examiner* — Suzanne L Barrett
(74) *Attorney, Agent, or Firm* — Nixon & Vanderhye P.C.

(57) ABSTRACT

Electromechanical lock utilizing magnetic field forces. An actuator is moved between a locked position and an unlocked position. In the locked position, a first permanent magnet directs a first magnetic field exerting a pushing force so that rotation of the first axle is blocked, and a second permanent magnet directs a second magnetic field exerting a pulling force so that the first axle is kept uncoupled with the second axle. In the unlocked position, the first permanent magnet directs a reversed first magnetic field exerting a pulling force so that the first axle is released to rotate, and the second permanent magnet directs a reversed second magnetic field exerting a pushing force so that the first axle becomes coupled with the second axle.

17 Claims, 6 Drawing Sheets

(52) U.S. Cl.
CPC ........ *E05B 47/0044* (2013.01); *E05B 47/063* (2013.01); *E05B 47/0615* (2013.01); *E05B 47/0649* (2013.01); *E05B 47/0673* (2013.01); *E05B 47/0692* (2013.01); *H02K 49/104* (2013.01); *E05B 2047/0017* (2013.01); *E05B 2047/0057* (2013.01); *E05B 2047/0058* (2013.01); *E05B 2047/0062* (2013.01); *E05B 2047/0064* (2013.01); *E05B 2047/0081* (2013.01); *E05B 2047/0084* (2013.01); *E05B 2047/0093* (2013.01); *E05B 2047/0094* (2013.01); *E05B 2047/0095* (2013.01)

(58) Field of Classification Search
CPC ............... E05B 47/063; E05B 47/0649; E05B 47/0673; E05B 47/0692; E05B 2047/0017; E05B 2047/0057; E05B 2047/0058; E05B 2047/0062; E05B 2047/0064; E05B 2047/0081; E05B 2047/0084; E05B 2047/0093; E05B 2047/0094; E05B 2047/0095; H02K 49/104
USPC .......................................................... 70/276
See application file for complete search history.

(56) References Cited

U.S. PATENT DOCUMENTS

| | | | | |
|---|---|---|---|---|
| 4,854,146 A | * | 8/1989 | O'Connell | E05B 17/04 70/277 |
| 5,839,307 A | * | 11/1998 | Field | E05B 47/0042 70/283 |
| 5,946,956 A | * | 9/1999 | Hotzl | E05B 17/22 70/276 |
| 10,253,528 B1 | * | 4/2019 | Pukari | E05B 47/0005 |
| 2003/0160681 A1 | * | 8/2003 | Menard | E05B 45/06 340/5.64 |
| 2006/0060708 A1 | * | 3/2006 | Decker | B64C 1/1407 244/129.5 |
| 2006/0156771 A1 | * | 7/2006 | Hauri | E05B 47/0649 70/278.7 |
| 2006/0220391 A1 | * | 10/2006 | Baragano Gonzalez | E05B 47/0002 292/194 |
| 2008/0217373 A1 | * | 9/2008 | Boffelli | H02K 49/104 227/113 |
| 2009/0308117 A1 | * | 12/2009 | Goldman | E05B 47/0603 70/277 |
| 2013/0061644 A1 | * | 3/2013 | Trent | E05B 47/0012 70/278.7 |
| 2018/0138796 A1 | * | 5/2018 | Yamashita | H02K 49/102 |

FOREIGN PATENT DOCUMENTS

| | | | | |
|---|---|---|---|---|
| EP | 1 443 162 | | 8/2004 | |
| EP | 2 466 043 | | 6/2012 | |
| EP | 2 813 647 | | 12/2014 | |
| EP | 3480396 | * | 5/2019 | ............ E05B 47/00 |
| GB | 2 208 678 | | 4/1989 | |
| KR | 1827223 | * | 3/2018 | ........... H02K 49/104 |
| WO | WO-2015140585 A1 | * | 9/2015 | ......... E05B 47/0005 |
| WO | WO-2015140669 | * | 9/2015 | ........... F04D 13/024 |

OTHER PUBLICATIONS

Written Opinion of the ISA of PCT/EP2016/066406, dated Sep. 28, 2016, 6 pages.
Extended Search Report of EP 15176420.6, dated Dec. 23, 2015, 8 pages.

* cited by examiner

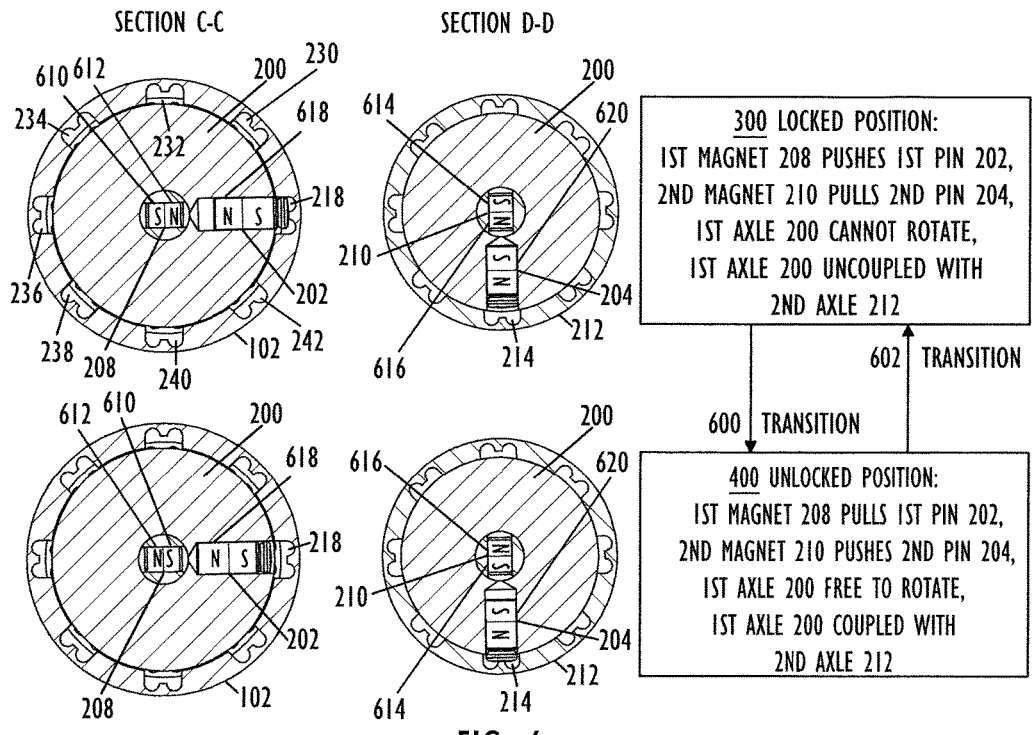
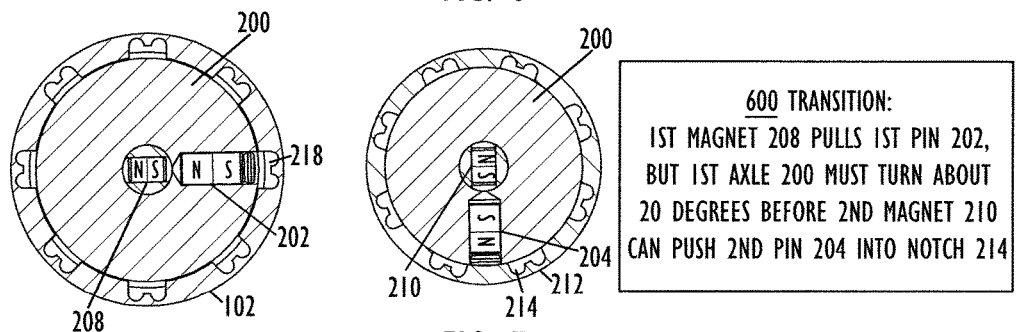
FIG. 7
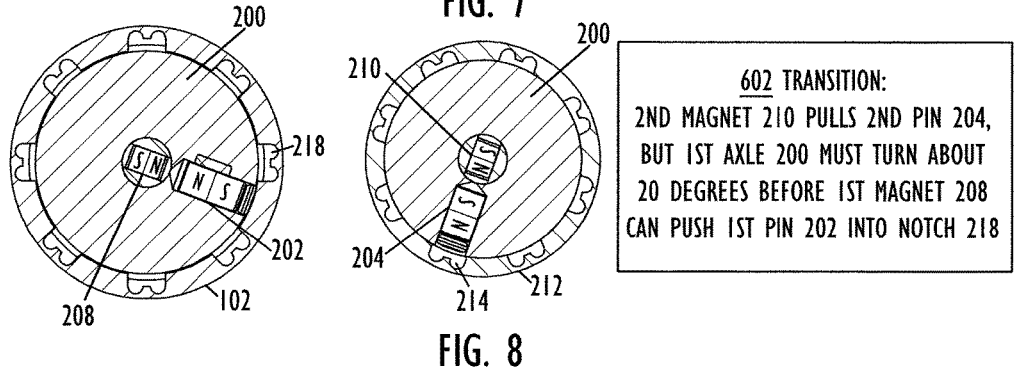
FIG. 8

ELECTROMECHANICAL LOCK UTILIZING MAGNETIC FIELD FORCES

This application is the U.S. national phase of International Application No. PCT/EP2016/066406 filed Jul. 11, 2016, which designated the U.S. and claims priority to EP 15176420.6, filed Jul. 13, 2015, the entire contents of each of which are hereby incorporated by reference.

FIELD

The invention relates to an electromechanical lock, and to a method in an electromechanical lock.

BACKGROUND

Electromechanical locks are replacing traditional mechanical locks. Further refinement is needed for making the electromechanical lock to consume as little electric power as possible, and/or improving the break-in security of the electromechanical lock, and/or simplifying the mechanical structure of the electromechanical lock.

EP 1443162 discloses a lock cylinder with a single coupling member utilizing permanent magnets.

EP 2466043 discloses a coupling device with a single coupling element utilizing a magnetic displacement force.

BRIEF DESCRIPTION

The present invention seeks to provide an improved electromechanical lock, and an improved method in an electromechanical lock.

According to an aspect of the present invention, there is provided an electromechanical lock as specified in claim 1. According to another aspect of the present invention, there is provided a method in an electromechanical lock as specified in claim 17.

The invention may provide at least one of the following advantages: reduce electric power consumption, improve the break-in security, and/or simplify the mechanical structure.

LIST OF DRAWINGS

Example embodiments of the present invention are described below, by way of example only, with reference to the accompanying drawings, in which FIG. 1 illustrates example embodiments of an electromechanical lock;

FIGS. 2A and 2B illustrate the same example embodiment of the electromechanical lock from two different views;

FIG. 3 discloses an example embodiment of the electromechanical lock in a locked position;

FIG. 6 illustrates example embodiments of the electromechanical lock utilizing the cross-section views C-C and D-D and its state diagram;

FIGS. 7 and 8 illustrate further example embodiments of the state diagram;

DESCRIPTION OF EMBODIMENTS

The following embodiments are only examples. Although the specification may refer to "an" embodiment in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

The Applicant, iLOQ Oy, has invented many improvements for the electromechanical locks, such as those disclosed in various EP and US patent applications/patents, incorporated herein as references in all jurisdictions where applicable. A complete discussion of all those details is not repeated here, but the reader is advised to consult those applications.

Figure 1:
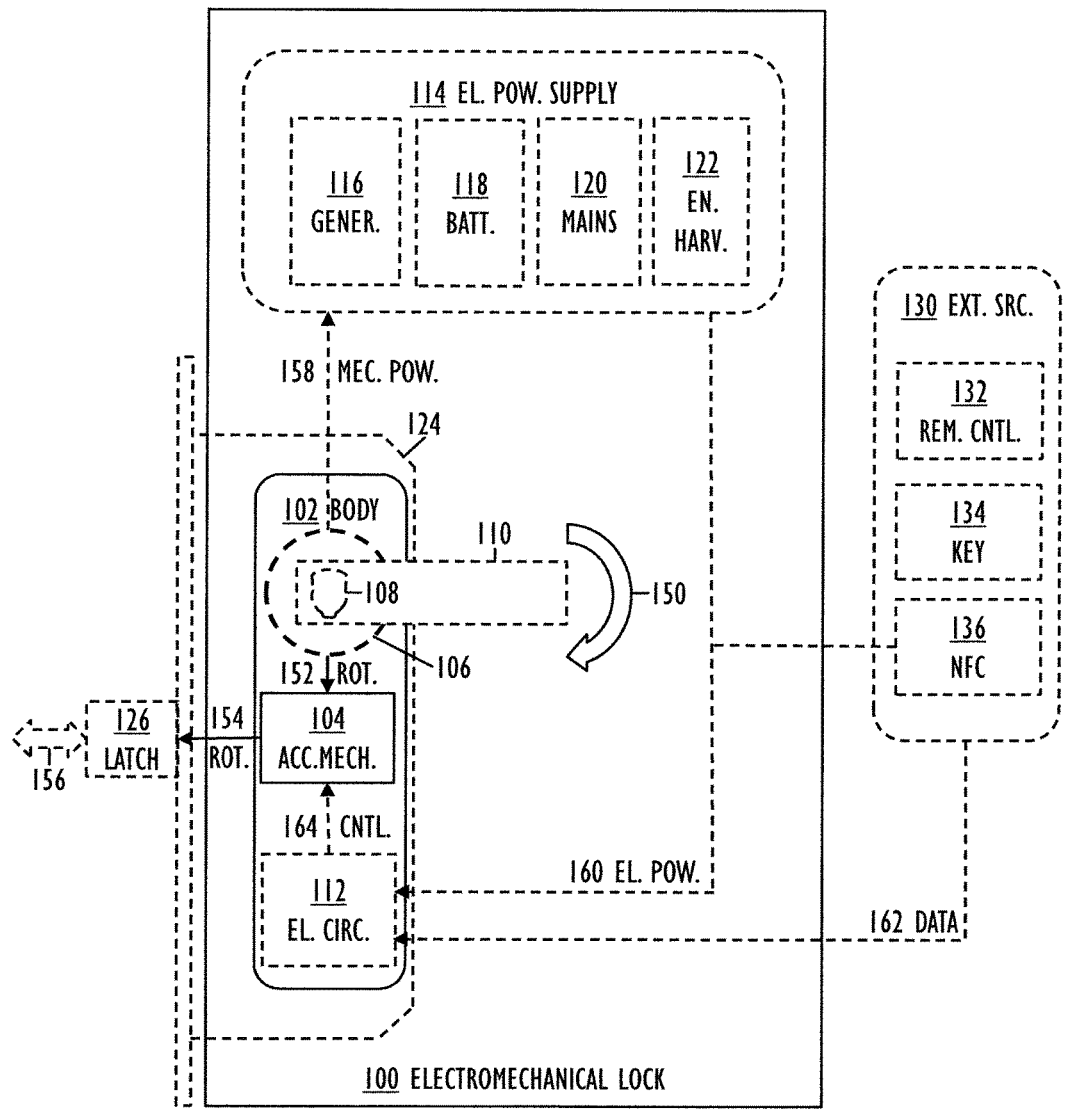

Let us now turn to FIG. 1, which illustrates an example embodiment of an electromechanical lock 100, but with only such parts shown that are relevant to the present example embodiments.

In an example embodiment, the electromechanical lock 100 comprises an electronic circuit 112 configured to read data 162 from an external source 130 and match the data 162 against a predetermined criterion. In an example embodiment, besides reading, the electronic circuit 112 may also write data to the external source 130.

In an example embodiment, the electromechanical lock 100 comprises an access control mechanism 104.

In an example embodiment shown in FIG. 1, the electronic circuit 112 electrically controls 164 the access control mechanism 104.

In an example embodiment, an electric power supply 114 powers 160 both the electronic circuit 112 and the access control mechanism 104.

In an example embodiment, electric energy required by the access control mechanism 104 is generated in a self-powered fashion within the electromechanical lock 100 so that the electric power supply 114 comprises a generator 116.

In an example embodiment, rotating 150 a knob 106 may operate 158 the generator 116.

In an example embodiment, pushing down 150 a door handle 110 may operate 158 the generator 116.

In an example embodiment, rotating 150 a key 134 in a keyway 108, or pushing the key 134 into the keyway 108, may operate 158 the generator 116.

In an example embodiment, rotating 150 the knob 106, and/or pushing down 150 the door handle 110, and/or rotating 150 the key 134 in the keyway 108 may mechanically affect 152, such as cause rotation, the access control mechanism 104.

In an example embodiment, the electric power supply 114 comprises a battery 118. The battery 118 may be a single use or rechargeable accumulator, possibly based on at least one electrochemical cell.

In an example embodiment, the electric power supply 114 comprises mains electricity 120, i.e., the electromechanical lock 100 may be coupled to the general-purpose alternating-current electric power supply, either directly or through a voltage transformer.

In an example embodiment, the electric power supply 114 comprises an energy harvesting device 122, such as a solar cell that converts the energy of light directly into electricity by the photovoltaic effect.

In an example embodiment, electric energy 160 required by the access control mechanism 104 (and possibly required by the electronic circuit 112) is sporadically imported from some external source.

In an example embodiment, the external source 130 comprises a remote control system 132 coupled in a wired or wireless fashion with the electronic circuit 112.

In an example embodiment, the external source 130 comprises NFC (Near Field Communication) technology 136 containing the data 162, i.e., a smartphone or some other user terminal holds the data 162. NFC is a set of standards for smartphones and similar devices to establish radio communication with each other by touching them together or bringing them into close proximity. In an example embodiment, the NFC technology 136 may be utilized to provide 160 the electric energy for the electronic circuit 112 and/or for the access control mechanism 104. The smartphone or other portable electronic device creates an electromagnetic field around it and an NFC tag embedded in electromechanical lock 100 is charged by that field.

In an example embodiment, the external source 130 comprises the key 134 containing the data 120, stored and transferred by suitable techniques (for example: encryption, RFID, iButton® etc.).

As shown in FIG. 1, in an example embodiment, the electromechanical lock 100 may be placed in a lock body 102, and the access control mechanism 104 may control 154 a latch (or a lock bolt) 126 moving 156 in and out (of a door fitted with the lock 100, for example).

In an example embodiment, the lock body 102 is implemented as a lock cylinder, which may be configured to interact with a latch mechanism 124 operating the latch 126.

In an example embodiment, the electronic circuit 112 and the access control mechanism 104 may be placed inside the lock cylinder 102.

Although not illustrated in FIG. 1, the generator 116 may be placed inside the lock cylinder 102 as well.

Now that the general structure of the electromechanical lock 100 has been described, let us next study the access control mechanism 104 in more detail with reference to the remaining Figures.

Figure 2A:
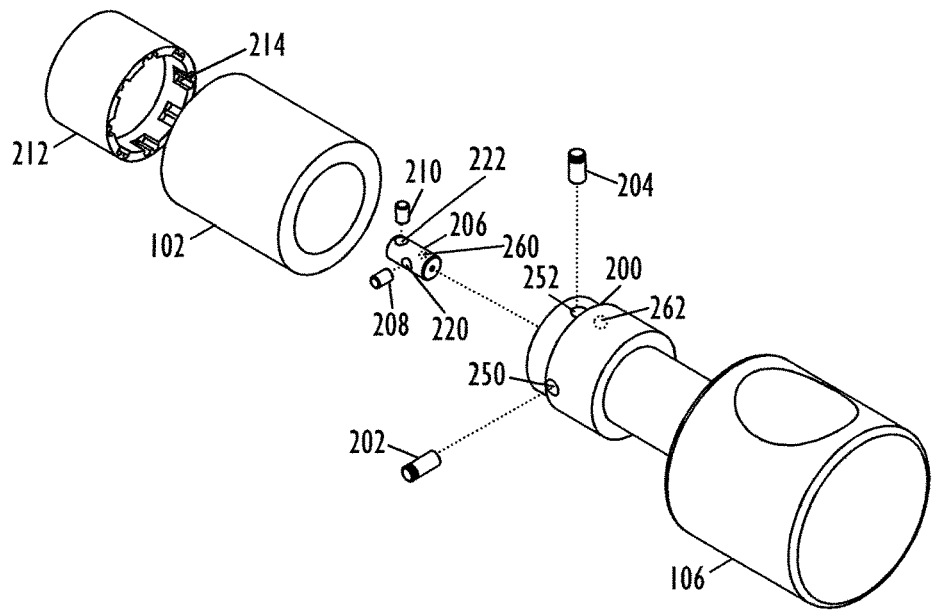
Figure 2B:
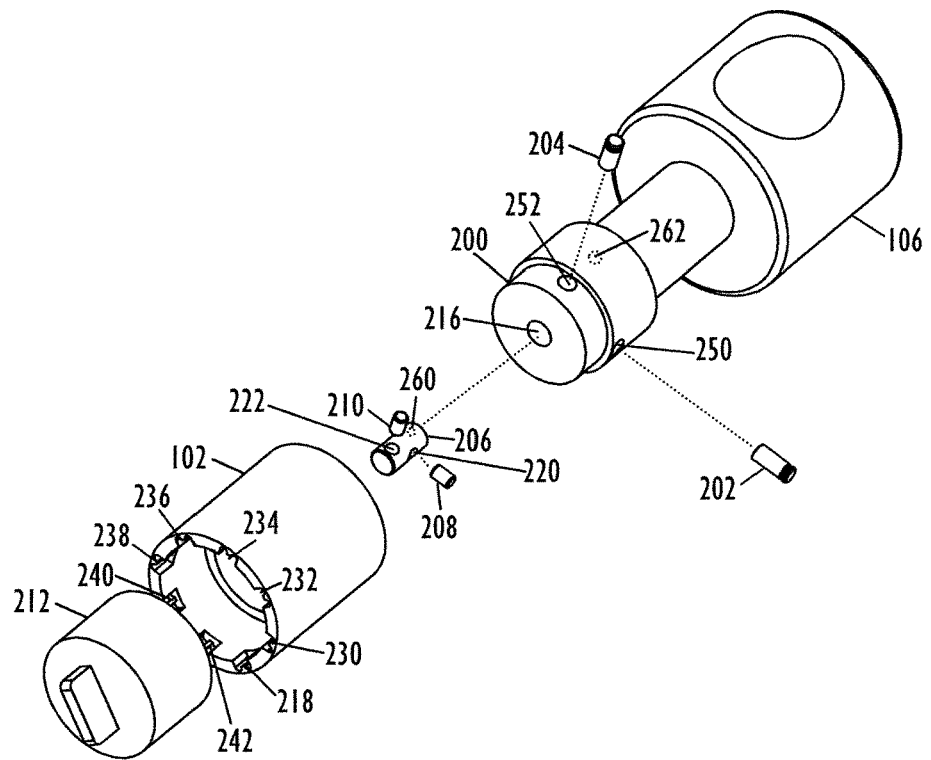

FIGS. 2A and 2B illustrate an example embodiment of the electromechanical lock 100 from two different views.

The electromechanical lock 100 comprises the lock body 102, a first axle 200 configured to be rotatable, a first permanent magnet pin 202 coupled with the first axle 200, a second permanent magnet pin 204 coupled with the first axle 200, a second axle 212 configured to be rotatable, an actuator 206, 216 configured to move between a locked position and an unlocked position, a first permanent magnet 208 coupled with the actuator 206, 216, and a second permanent magnet 210 coupled with the actuator 206, 216. A permanent magnet is an object made from a material that is magnetized and creates its own persistent magnetic field.

The actuator 206, 216 is a transducer that accepts energy and produces the kinetic energy of movement (=action between the locked position and the unlocked position). In an example embodiment, the actuator 206, 216 is implemented with an electric motor, which is an electrical machine that converts electrical energy into mechanical energy. In an example embodiment, the actuator 206, 216 is implemented with a stepper motor, which may be capable of producing precise rotations. In an example embodiment, the actuator 206, 216 is implemented with a solenoid, such as an electromechanical solenoid converting electrical energy into motion. In an example embodiment, the actuator 206, 216 is a piezo actuator utilizing piezoelectricity.

The first axle 200 and the second axle 212 are configured to be couplable with each other.

Figure 3:
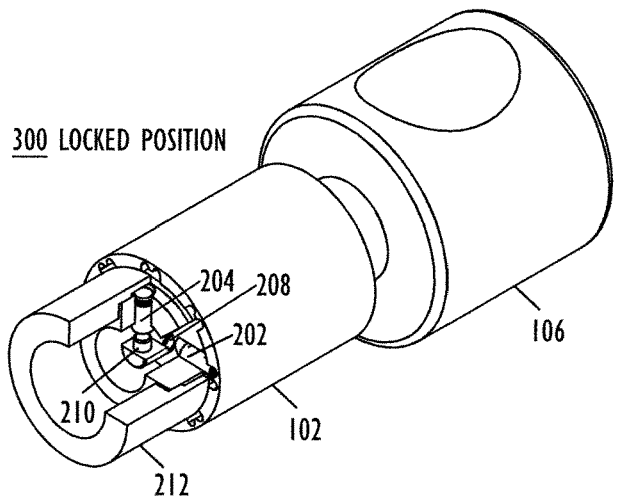

FIG. 3 discloses an example embodiment of the electromechanical lock 100 in the locked position 300 of the actuator 206, 216. In the locked position of the actuator 206, 216, the first permanent magnet 208 is configured to direct a first magnetic field exerting a pushing force to move the first permanent magnet pin 202 into a contact with the lock body 102 so that rotation of the first axle 200 is blocked, and the second permanent magnet 210 is configured to direct a second magnetic field exerting a pulling force to move the second permanent magnet pin 204 so that the first axle 200 is kept uncoupled with the second axle 212. In essence, the rotation of the first axle 200 is blocked, and the first axle 200 is uncoupled with the second axle 212. If the electromechanical lock 100 is now subjected to an external break-in force, two things must happen in order the lock 100 to open: the first axle 200 must be released to rotate, and the first axle 200 and the second axle 212 must be coupled with each other and rotated.

Figure 4:
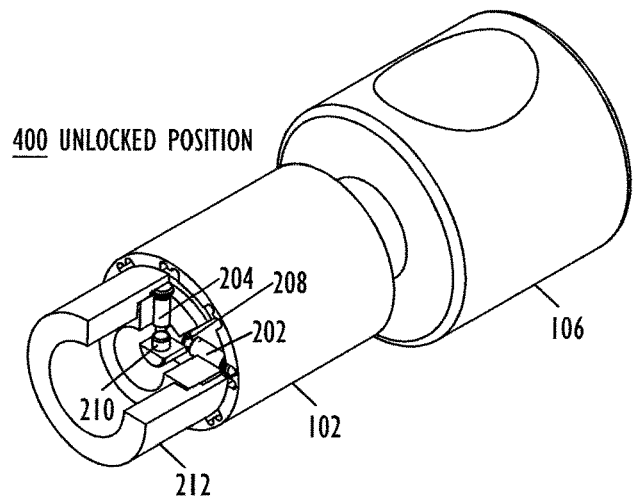
FIG. 4 illustrates an example embodiment of the electromechanical lock in an unlocked position.

FIG. 4 illustrates an example embodiment of the electromechanical lock 100 in the unlocked position 400 of the actuator 206, 216. In the unlocked position of the actuator 206, 216, the first permanent magnet 208 is configured to direct a reversed first magnetic field exerting a pulling force to move the first permanent magnet pin 202 so that the first axle 200 is released to rotate, and the second permanent magnet 210 is configured to direct a reversed second magnetic field exerting a pushing force to move the second permanent magnet pin 204 so that the first axle 200 becomes coupled with the second axle 212. Now that the opening is rightfully permitted, the rotation of the first axle 200 is allowed, and the the first axle 200 is coupled with the second axle 212. The front-end of the lock 100 may now rotate the back-end of the lock 100.

In the example embodiment illustrated in FIGS. 3 and 4, the first axle 200 is configured to receive rotation by a user and the second axle 212 is permanently coupled with the latch mechanism 124. In our example embodiment, the knob 106 receives the rotation by the user, which is transmitted, in the unlocked position of the actuator 206, 216, through the turning of the first axle 200 in unison with the second axle 212 to the latch mechanism 124 withdrawing 156 the latch 126. Naturally, the knob 106 in this example embodiment may be replaced with the handle 110 or the keyway 108 as previously discussed.

However, a "reversed" example embodiment is also feasible: the first axle 200 may be permanently coupled with the latch mechanism 124 and the second axle 212 may be configured to receive the rotation by the user. If we apply this alternate example embodiment to the Figures of 3 and 4, this means that the knob 106 rotates freely in the locked position of the actuator 206, 216, whereas the backend 212 is blocked to rotate, and, in the unlocked position of the actuator 206, 216, the backend 212 is released to rotate and the first axle 200 and the second axle 212 are coupled together.

Figure 5:
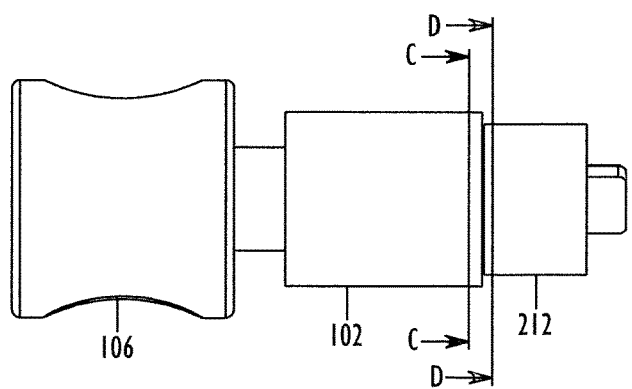
FIG. 5 illustrates an example embodiment of the electromechanical lock viewed from the side illustrating cross-sections C-C and D-D.

FIG. 5 illustrates an example embodiment of the electromechanical lock 100 viewed from the side illustrating cross-sections C-C (lock body 102—first axle 200—first permanent magnet 208—first permanent magnet pin 202) and D-D (second axle 212—second permanent magnet 210—second permanent magnet pin 204).

FIG. 6 illustrates example embodiments of the electromechanical lock 100 utilizing the cross-section views C-C and D-D and its state diagram.

The positions of the magnets 208, 210 and pins 202, 204 and their effect on magnetic fields and the reversed magnetic fields are illustrated in FIGS. 6, 7 and 8 with pole naming conventions, the North pole N and the South pole S: the opposite poles (S-N) attract each other, whereas similar poles (N-N or S-S) repel each other.

Now, the locked position 300 and the unlocked position 400 of the lock 100, explained earlier with reference to FIGS. 3 and 4 become even clearer.

In the locked position 300 of the actuator 206, 216, the first permanent magnet 208 pushes the first permanent magnet pin 202 into a contact with the lock body 102, and the second permanent magnet 210 pulls the second permanent magnet pin 204, whereby the first axle 200 cannot rotate, and the first axle 200 remains uncoupled with the second axle 212.

In the unlocked position 400 of the actuator 206, 216, the first permanent magnet 208 pulls the first permanent magnet pin 202 free from the lock body 102, and the second permanent magnet 210 pushes the second permanent magnet pin 204, whereby the first axle 200 is released to rotate, and the first axle 200 becomes coupled with the second axle 212.

In an example embodiment, the first permanent magnet 208 and the second permanent magnet 210 are configured to move in a synchronous manner in relation to each other as the actuator 206, 216 moves between the locked position 300 and the unlocked position 400. Such synchronization ensures that the magnets 208, 210 remain in correct relation with each other during operation of the lock 100.

In an example embodiment, the actuator 216 comprises a rotating shaft 206 configured to move between the locked position 300 and the unlocked position 400 by a predetermined amount of rotation or counter-rotation. As can be seen in FIGS. 2A and 2B, the first permanent magnet 208 and the second permanent magnet 210 may be fixed to holes 220, 222 made in the shaft 206. The first permanent magnet pin 202 may be fitted into a hollow 250, and the second permanent magnet pin 204 may be fitted into a hollow 252. The pins 202, 204 may be configured to move within the hollows 250, 252 by the forces between them and the permanent magnets 208, 210. In an example embodiment, the pins 202, 204 may be permanent magnets coated by suitable material withstanding wear and force, or attached to pin-like structures.

In an example embodiment, movement directions of the first permanent magnet pin 202 and the second permanent magnet pin 204 are at an angle between 30 and 150 degrees to each other. This feature may improve the security of the lock 100 as external break-in force is applied. It is also to be noted that the break-in force should move the pins 202, 204 in opposite directions at the same time. As FIGS. 3, 4 and 6 illustrate, in an example embodiment, the movement directions of the first permanent magnet pin 202 and the second permanent magnet pin 204 are essentially perpendicular to each other. Furthermore, the first permanent magnet pin 202 and the second permanent magnet pin 204 may be separated from each other in axial direction of the first axle 200.

FIG. 6 also illustrates an example embodiment, wherein the actuator 206, 216 is configured to move between the locked position 300 and the unlocked position 400 as follows: the first permanent magnet 208 is moved such that a first pole 610 of the first permanent magnet 208 takes the place of a second pole 612 of the first permanent magnet 208, and the second permanent magnet 210 is moved such that a first pole 614 of the second permanent magnet 210 takes the place of a second pole 616 of the second permanent magnet 210.

FIG. 6 also illustrates an example embodiment, wherein:

the first permanent magnet 208 is configured to direct the first magnetic field exerting the pushing force to move the first permanent magnet pin 202 due to the poles 612, 618 of the first permanent magnet 208 and the first permanent magnet pin 202 being similar to each other (in the locked position 300), the second permanent magnet 210 is configured to direct the second magnetic field exerting the pulling force to move the second permanent magnet pin 204 due to the poles 616, 620 of the second permanent magnet 210 and the second permanent magnet pin 204 being opposite to each other (in the locked position 300), the first permanent magnet 208 is configured to direct the reversed first magnetic field exerting the pulling force to move the first permanent magnet pin 202 due to the poles 610, 618 of the first permanent magnet 208 and the first permanent magnet pin 202 being opposite to each other (in the unlocked position 400), and the second permanent magnet 210 is configured to direct the reversed second magnetic field exerting the pushing force to move the second permanent magnet pin 204 due to the poles 614, 620 of the second permanent magnet 210 and the second permanent magnet pin 204 being similar to each other (in the unlocked position 400).

FIG. 7 illustrates transition 600 from the locked position 300 to the unlocked position 400. The first permanent magnet 208 pulls the first permanent magnet pin 202, but the first axle 200 must turn about 20 degrees before the second permanent magnet 210 can push the second permanent magnet pin 204 into the notch 214 in the second axle 212.

FIG. 8 illustrates transition 602 from the unlocked position 400 to the locked position 300. The second permanent magnet 210 pulls the second permanent magnet pin 204, but the first axle 200 must turn about 20 degrees before the first permanent magnet 208 can push the first permanent magnet pin 202 into the notch 218 in the lock body 102.

In an example embodiment illustrated in FIGS. 2A, 2B, 3 and 4, the first axle 200 and the second axle 212 are configured so that the first axle 200 is at least partly fitted inside the second axle 212.

FIGS. 2A, 2B, 3 and 4 also illustrate an example embodiment, wherein the first permanent magnet pin 202 is coupled with the first axle 200 so that the contact with the lock body 102 takes place outside of the second axle 212, and the second permanent magnet pin 204 is coupled with the first axle 200 so that the first axle 200 becomes coupled with the second axle 212 inside the second axle 212.

In an example embodiment illustrated in FIGS. 2B, 3, 4 and 6, the lock body 102 comprises a notch 218 configured to hold the first permanent magnet pin 202, and, in the locked position 300, the first permanent magnet pin 202 is moved into the notch 218 of the lock body 102 so that the rotation of the first axle 200 is blocked.

FIGS. 2B and 6 further illustrate an example embodiment, wherein the lock body 102 further comprises a plurality of further notches 230, 232, 234, 236, 238, 240, 242 configured to hold the first permanent magnet pin 202, and, if the electromechanical lock 100 is subjected to an external break-in force, which releases the first permanent magnet pin 202 from the notch 218 of the lock body 102, and the first axle 200 starts to rotate, the first permanent magnet pin 202 is configured to enter into one of the further notches 230, 232, 234, 236, 238, 240, 242 of the lock body 102, whereby the first axle 200 stops to rotate. In our example embodiment, the number of the further notches 230, 232, 234, 236, 238, 240, 242 is seven, but it may vary.

In an example embodiment illustrated in FIGS. 2A and 6, the second axle 212 comprises at least one notch 214 configured to receive the second permanent magnet pin 204 in the unlocked position 400. As shown, there may be more than one notch 214, in our example embodiment eight notches 214, in order to reduce the needed amount of the rotation to capture the second permanent magnet pin 204 into the notch 214.

In an example embodiment, the electromechanical lock 100 further comprises, coupled with either the first axle 200 or the second axle 212, one of the knob 106, the door handle 110 or the keyway 108.

In an example embodiment, the electromechanical lock 100 further comprises the electronic circuit 112 configured to read the data 162 from the external source 130 and match the data 162 against the predetermined criterion, and, provided that the data 162 matches the predetermined criterion, the actuator 206, 216 is configured to move from the locked position 300 to the unlocked position 400.

Figure 9:
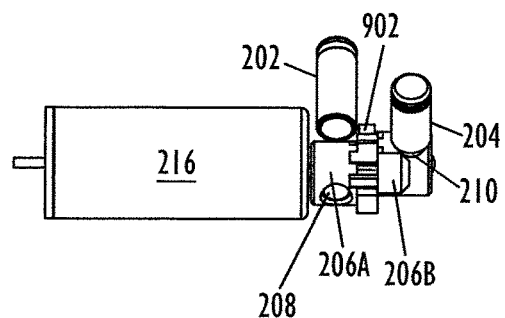
FIG. 9 illustrates a further example embodiment of the electromechanical lock, FIG. 10 illustrating its locked position, and FIG. 11 its unlocked position.
Figure 10:
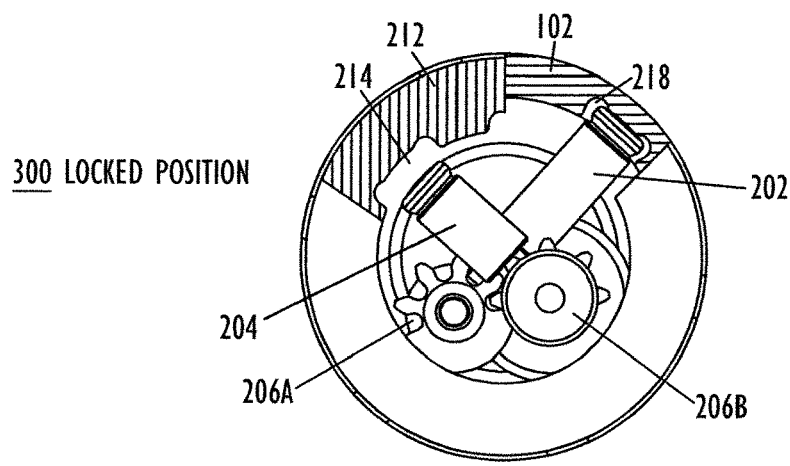
Figure 11:
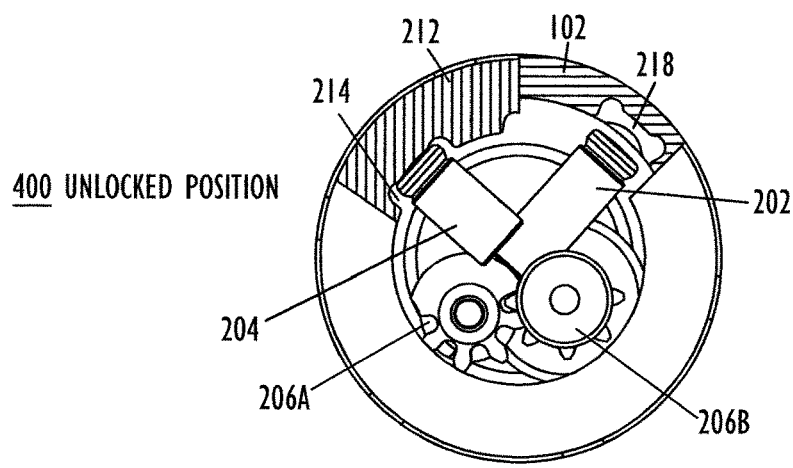

FIG. 9 illustrates a further example embodiment of the electromechanical lock 100, FIG. 10 illustrating its locked position 300, and FIG. 11 its unlocked position 400. Now, the actuator 216 comprises a two-part rotating shaft 206A, 206B, wherein the first shaft part 206A is coupled with the first permanent magnet 208, the second shaft part 206B is coupled with the second permanent magnet 210, and there is a gearing 902 between the shaft parts 206A, 206B.

In the locked position 300, the shafts 206A, 206B are in such a position, where the first permanent magnet 208 pushes the first permanent magnet pin 202 into the notch 218 in the lock body 102, and the second permanent magnet 208 pulls the second permanent magnet pin 204 so that it does not enter into the notch 214 in the second axle 212.

In the unlocked position 400, the shafts 206A, 206B are in such a position, where the first permanent magnet 208 pulls the first permanent magnet pin 202 out of the notch 218 in the lock body 102, and the second permanent magnet 208 pushes the second permanent magnet pin 204 into the notch 214 in the second axle 212.

In an example embodiment illustrated in FIGS. 2A and 2B, the electromechanical lock 100 further comprises further first permanent magnets 208 coupled with the actuator 206, 216, and further first permanent magnet pins 202 coupled with the first axle 200. There is no illustration for the further permanent magnets and the further permanent magnet pins, but this may be implemented in the example embodiment of FIGS. 2A and 2B so that the further first permanent magnets are fixed to further holes 260 made in the shaft 206, and the further permanent magnet pins are fitted to move in further hollows 262. In an example embodiment, the total number of the first permanent magnet pins 202 is four, and if they are divided along the 360 degrees circumference with a 90 degrees separation between each, the total number of the first permanent magnets 208 is two (as the opposing poles of a single first permanent magnet 208 may be used to control two first permanent magnet pins 202). With this example embodiment, the security of the lock 100 may further be enhanced.

In the locked position 300, the further first permanent magnets 208 are configured to direct further first magnetic fields exerting further pushing forces to move the further first permanent magnet pins 202 into further contacts with the lock body 102 so that the rotation of the first axle 200 is blocked, In the unlocked position 400, the further first permanent magnets 208 are configured to direct further reversed first magnetic fields exerting further pulling forces to move the further first permanent magnet pins 202 so that the first axle 200 is released to rotate, It is to be noted that this example embodiment may be applicable even in such a structure, wherein the first axle 200 is permanently coupled with the latch mechanism 124, i.e. there is no decoupling/coupling with the second axle 212. In such a case, the structure is as follows: the electromechanical lock 100 comprises:

a lock body 102;
an axle 200 configured to be rotatable;
(a latch mechanism 124 permanently coupled with the axle 200, the latch mechanism configured to operate a latch 126;)
a plurality of permanent magnet pins 202 coupled with the axle 200;
an actuator 206, 216 configured to move between a locked position 300 and an unlocked position 400; and
a plurality of permanent magnets 208 coupled with the actuator 206, 216;
wherein
  in the locked position 300, the plurality of the permanent magnets 208 are configured to direct magnetic fields exerting pushing forces to move the plurality of the permanent magnet pins 202 into contacts with the lock body 102 so that rotation of the axle 200 is blocked, whereas,
  in the unlocked position 400, the plurality of the permanent magnets 208 are configured to direct reversed magnetic fields exerting pulling forces to move the plurality of the permanent magnet pins 202 so that the axle 200 is released to rotate (and use the rotation to open the latch 126 with the latch mechanism 124).

Figure 12:
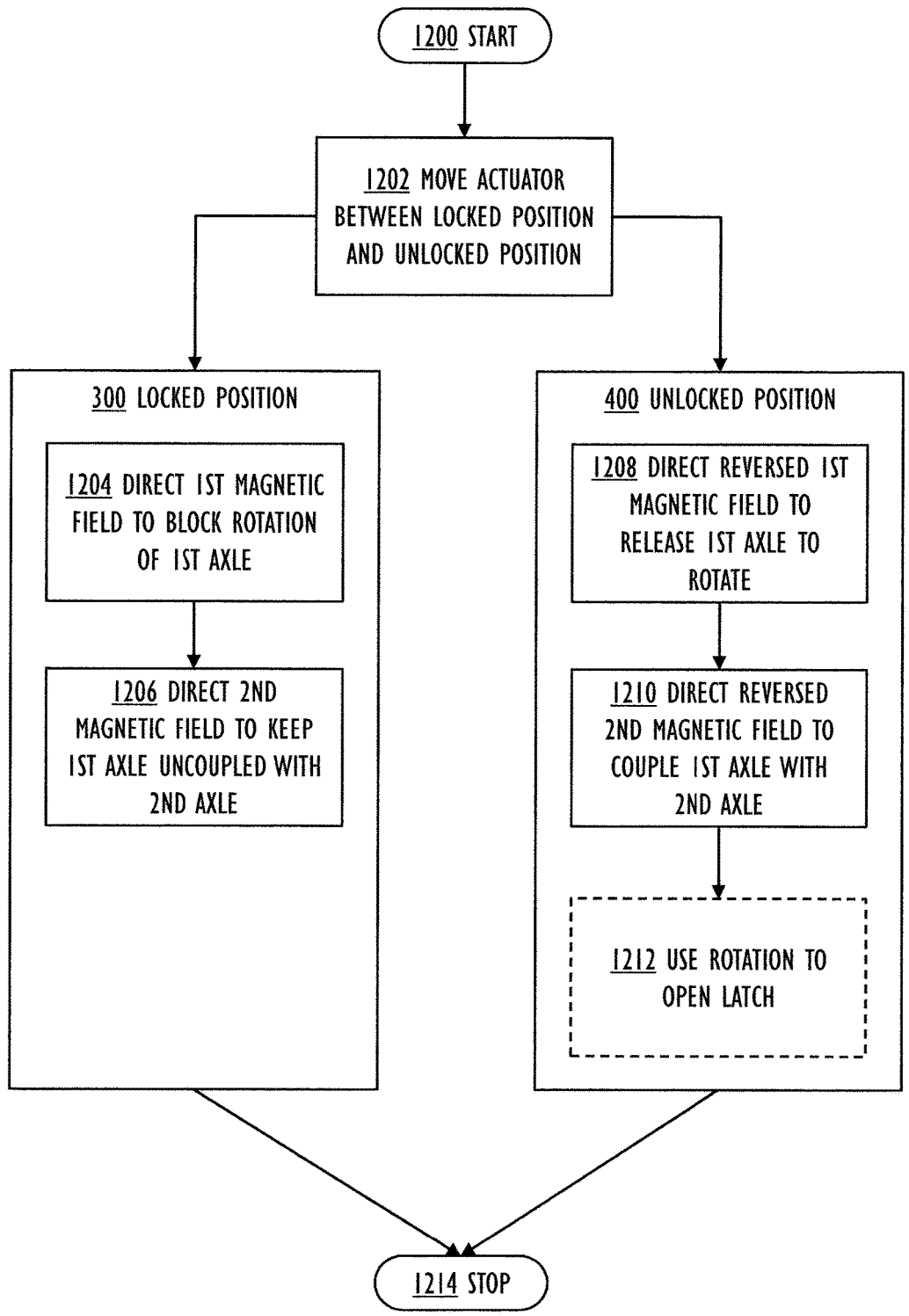
FIG. 12 is a flow chart illustrating a method in the electromechanical lock.

Next, let us study FIG. 12 illustrating a method performed in the electromechanical lock 100. The operations are not strictly in chronological order, and some of the operations may be performed simultaneously or in an order differing from the given ones. Other functions may also be executed between the operations or within the operations and other data exchanged between the operations. Some of the operations or part of the operations may also be left out or replaced by a corresponding operation or part of the operation. It should be noted that no special order of operations is required, except where necessary due to the logical requirements for the processing order.

The method starts in 1200.

In 1202, an actuator is moved between a locked position 300 and an unlocked position 400.

In the locked position 300, a first permanent magnet directs a first magnetic field exerting a pushing force so that rotation of the first axle is blocked in 1204, and a second permanent magnet directs a second magnetic field exerting a pulling force so that the first axle is kept uncoupled with the second axle in 1206.

In the unlocked position 400, the first permanent magnet directs a reversed first magnetic field exerting a pulling force so that the first axle is released to rotate in 1208, and the second permanent magnet directs a reversed second magnetic field exerting a pushing force so that the first axle becomes coupled with the second axle in 1210. The rotation of the first axle may now be used to open the latch in 1212.

The method ends in 1214.

The already described example embodiments of the electromechanical lock 100 may be utilized to enhance the method with various further example embodiments. For example, various structural and/or operational details may supplement the method.

It will be obvious to a person skilled in the art that, as technology advances, the inventive concept can be implemented in various ways. The invention and its embodiments are not limited to the example embodiments described above but may vary within the scope of the claims.

The invention claimed is:

1. An electromechanical lock comprising:
a lock body;
a first axle configured to be rotatable;
a first permanent magnet pin coupled with the first axle;
a second permanent magnet pin coupled with the first axle;
a second axle configured to be rotatable;
an actuator configured to move between a locked position and an unlocked position;
a first permanent magnet coupled with the actuator; and
a second permanent magnet coupled with the actuator; wherein
the first axle and the second axle are configured to be couplable with each other, and
in the locked position, the first permanent magnet is configured to direct a first magnetic field exerting a pushing force to move the first permanent magnet pin into a contact with the lock body so that rotation of the first axle is blocked, and the second permanent magnet is configured to direct a second magnetic field exerting a pulling force to move the second permanent magnet pin so that the first axle is kept uncoupled with the second axle, whereas,
in the unlocked position, the first permanent magnet is configured to direct a reversed first magnetic field exerting a pulling force to move the first permanent magnet pin so that the first axle is released to rotate, and the second permanent magnet is configured to direct a reversed second magnetic field exerting a pushing force to move the second permanent magnet pin so that the first axle becomes coupled with the second axle.

2. The electromechanical lock of claim 1, wherein the first axle is configured to receive rotation by a user and the second axle is permanently coupled with a latch mechanism.

3. The electromechanical lock of claim 1, wherein the first axle is permanently coupled with a latch mechanism and the second axle is configured to receive rotation by a user.

4. The electromechanical lock of claim 1, wherein the first permanent magnet and the second permanent magnet are configured to move in a synchronous manner in relation to each other as the actuator moves between the locked position and the unlocked position.

5. The electromechanical lock of claim 1, wherein the actuator comprises a rotating shaft configured to move between the locked position and the unlocked position by a predetermined amount of rotation or counter-rotation.

6. The electromechanical lock of claim 1, wherein movement directions of the first permanent magnet pin and the second permanent magnet pin are at an angle between 30 and 150 degrees to each other.

7. The electromechanical lock of claim 1, wherein the actuator is configured to move between the locked position and the unlocked position as follows: the first permanent magnet is moved such that a first pole of the first permanent magnet takes the place of a second pole of the first permanent magnet, and the second permanent magnet is moved such that a first pole of the second permanent magnet takes the place of a second pole of the second permanent magnet.

8. The electromechanical lock of claim 1, wherein
the first permanent magnet is configured to direct the first magnetic field exerting the pushing force to move the first permanent magnet pin due to the poles of the first permanent magnet and the first permanent magnet pin being similar to each other,
the second permanent magnet is configured to direct the second magnetic field exerting the pulling force to move the second permanent magnet pin due to the poles of the second permanent magnet and the second permanent magnet pin being opposite to each other,
the first permanent magnet is configured to direct the reversed first magnetic field exerting the pulling force to move the first permanent magnet pin due to the poles of the first permanent magnet and the first permanent magnet pin being opposite to each other, and
the second permanent magnet is configured to direct the reversed second magnetic field exerting the pushing force to move the second permanent magnet pin due to the poles of the second permanent magnet and the second permanent magnet pin being similar to each other.

9. The electromechanical lock of claim 1, wherein the first axle and the second axle are configured so that the first axle is at least partly fitted inside the second axle.

10. The electromechanical lock of claim 1, wherein the first permanent magnet pin is coupled with the first axle so that the contact with the lock body takes place outside of the second axle, and the second permanent magnet pin is coupled with the first axle so that the first axle becomes coupled with the second axle inside the second axle.

11. The electromechanical lock of claim 1, wherein the lock body comprises a notch configured to hold the first permanent magnet pin, and, in the locked position, the first permanent magnet pin is moved into the notch of the lock body so that the rotation of the first axle is blocked.

12. The electromechanical lock of claim 11, wherein the lock body further comprises a plurality of further notches configured to hold the first permanent magnet pin, and, if the electromechanical lock is subjected to an external break-in force, which releases the first permanent magnet pin from the notch of the lock body, and the first axle starts to rotate, the first permanent magnet pin is configured to enter into one of the further notches of the lock body, whereby the first axle stops to rotate.

13. The electromechanical lock of claim 1, wherein the second axle comprises at least one notch configured to receive the second permanent magnet pin in the unlocked position.

14. The electromechanical lock of claim 1, wherein the electromechanical lock further comprises, coupled with either the first axle or the second axle, one of a knob, a door handle or a keyway.

15. The electromechanical lock of claim 1, wherein the electromechanical lock further comprises an electronic circuit configured to read data from an external source and match the data against a predetermined criterion, and, provided that the data matches the predetermined criterion, the actuator is configured to move from the locked position to the unlocked position.

16. The electromechanical lock of claim 1, further comprising further first permanent magnets coupled with the actuator, and further first permanent magnet pins coupled with the first axle,
   wherein
      in the locked position, the further first permanent magnets are configured to direct further first magnetic fields exerting further pushing forces to move the further first permanent magnet pins into further contacts with the lock body so that the rotation of the first axle is blocked, whereas,
      in the unlocked position, the further first permanent magnets are configured to direct further reversed first magnetic fields exerting further pulling forces to move the further first permanent magnet pins so that the first axle is released to rotate.

17. A method in an electromechanical lock comprising:
   moving an actuator between a locked position and an unlocked position;
   in the locked position, directing, by a first permanent magnet, a first magnetic field exerting a pushing force so that rotation of a first axle is blocked, and directing, by a second permanent magnet, a second magnetic field exerting a pulling force so that the first axle is kept uncoupled with a second axle; and
   in the unlocked position, directing, by the first permanent magnet, a reversed first magnetic field exerting a pulling force so that the first axle is released to rotate, and directing, by the second permanent magnet, a reversed second magnetic field exerting a pushing force so that the first axle becomes coupled with the second axle.

* * * * *